US008781169B2

(12) United States Patent
Jackson et al.

(10) Patent No.: US 8,781,169 B2
(45) Date of Patent: Jul. 15, 2014

(54) VEHICLE TRACKING AND LOCATING SYSTEM

(75) Inventors: Scott A. Jackson, Palatine, IL (US); Luke Smith, Palatine, IL (US)

(73) Assignee: Endeavoring, LLC, Palatine, IL (US)

( * ) Notice: Subject to any disclaimer, the term of this patent is extended or adjusted under 35 U.S.C. 154(b) by 448 days.

(21) Appl. No.: 13/230,507

(22) Filed: Sep. 12, 2011

(65) Prior Publication Data

US 2012/0106801 A1 May 3, 2012

Related U.S. Application Data

(60) Provisional application No. 61/409,623, filed on Nov. 3, 2010.

(51) Int. Cl.
*G06K 9/00* (2006.01)

(52) U.S. Cl.
USPC .......................................... 382/104; 707/781

(58) Field of Classification Search
USPC .......... 382/104, 105, 305, 306; 707/705, 736, 707/737, 758, 769, 771, 781, 802; 340/933, 340/937
See application file for complete search history.

(56) References Cited

U.S. PATENT DOCUMENTS

| | | | | |
|---|---|---|---|---|
| 6,081,206 | A * | 6/2000 | Kielland | 340/937 |
| 7,103,614 | B1 * | 9/2006 | Kucik | 707/104.1 |
| 2002/0111881 | A1 * | 8/2002 | Walker et al. | 705/26 |

OTHER PUBLICATIONS

Web Page from "Digital Recognition Network" dated Apr. 12, 2010.

* cited by examiner

*Primary Examiner* — Andrew W Johns
(74) *Attorney, Agent, or Firm* — Brinks Gilson & Lione

(57) ABSTRACT

A vehicle tracking and locating system provides information to a user about a vehicle of interest, and includes a database controller in operative communication with a database, and configured to receive data corresponding to vehicles from a plurality of client sources, and configured to save the data as information records corresponding to each client source. A plurality of external communication devices transmit a data request by the user corresponding to the vehicle of interest. A request server receives the data request in one a variety of communication formats. An input request processor operatively coupled to the request server is configured to obtain information records from the database corresponding to the data request. An output processor operatively coupled to the request server provides data of interest from the obtained information records for transmission to the respective communication device to satisfy the user request.

19 Claims, 6 Drawing Sheets

VEHICLE TRACKING AND LOCATING SYSTEM

CROSS-REFERENCE TO RELATED APPLICATIONS

This application claims the benefit of priority from provisional patent application Ser. No. 61/409,623, filed on Nov. 3, 2010, entitled Vehicle Tracking and Locating System, which is hereby incorporated by reference in its entirety.

BACKGROUND OF THE INVENTION

1. Technical Field

This disclosure relates to systems for identifying motor vehicles, and in particular, relates to systems for providing information about stolen vehicles and vehicles subject to repossession.

2. Background

Vehicles may be repossessed when a borrower is delinquent in payment of a loan or other contractual agreement. In a common scenario, if the borrower cannot timely service the loan and is delinquent in payments, the creditor may seek to repossess the vehicle, either directly or more commonly, through an affiliated repossession company.

The borrower may willingly relinquish possession of the vehicle to the repossession company. In such circumstances, the repossession company may take possession of the vehicle at the debtor's residence. In other situations, the debtor may not willingly relinquish possession of the vehicle, and may hide the vehicle or otherwise maintain the vehicle at an undisclosed location away from his or her place of residence. This renders it difficult for the repossession company to locate the vehicle.

Further, when a vehicle to be repossessed cannot be easily located, agents, "skip-tracers," and "spotters" associated with the repossession company may randomly view the license plates of vehicles in areas known to be frequented by the debtor, often based on the description of the vehicle. The repossession company may employ such skip-tracers and spotters, or may have contractual arrangements with the skip-tracers and spotters in other jurisdictions or with other repossession companies.

However this is very expensive, inefficient and time-consuming because the agent, spotter, or skip-tracer may have a set of documents for each vehicle to be repossessed, and must cross-reference the documents in his possession with each suspect license plate that he or she views while driving or while a passenger in a spotter vehicle.

SUMMARY

A vehicle tracking and locating system provides information to a user about a vehicle of interest. The system includes a database controller in operative communication with a database, and configured to receive data corresponding to vehicles from a plurality of client sources, and configured to save the data as information records corresponding to each client source. A plurality of external communication devices transmit a data request by the user corresponding to the vehicle of interest. A request server receives the data request in one of a variety of communication formats. An input request processor operatively coupled to the request server is configured to obtain information records from the database corresponding to the data request. An output processor operatively coupled to the request server provides the data of interest from the obtained information records for transmission to the respective communication device to satisfy the user request.

BRIEF DESCRIPTION OF THE DRAWINGS

The system may be better understood with reference to the following drawings and the description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Figure 1:
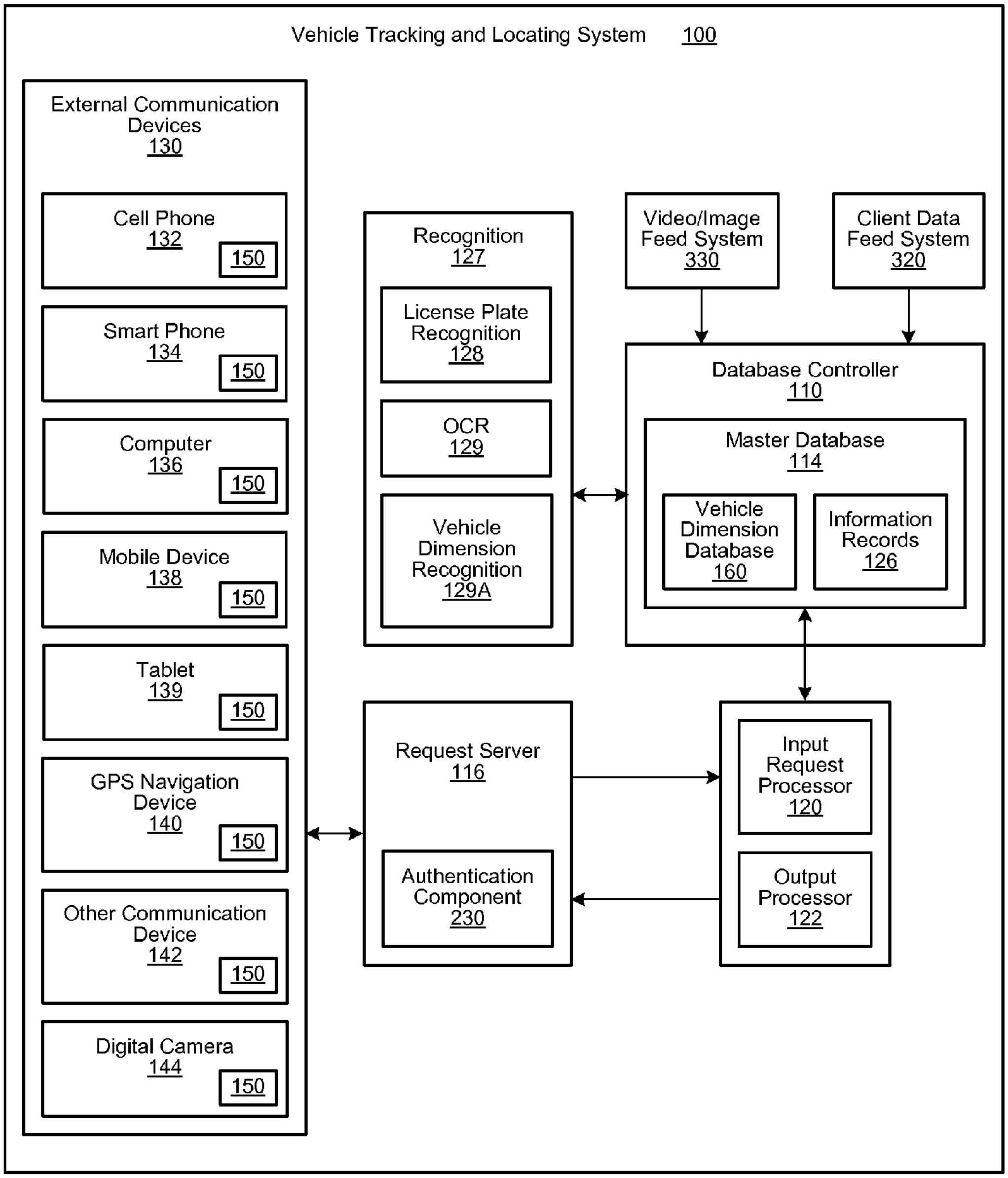
FIG. 1 is a block diagram of a vehicle tracking and locating system according to a specific embodiment.

FIG. 1 illustrates a vehicle tracking and locating system 100 that permits a user to obtain information relating to a vehicle of interest. A vehicle of interest may be a stolen vehicle, a vehicle subject to repossession, or any vehicle for which further information is sought by the user. A vehicle of interest may also relate to any vehicle associated with a marketing effort or advertising campaign.

The vehicle tracking and locating system 100 includes a database controller 110 in operative communication with a master database 114, a request server 116 configured to receive a data request from a user or agent, an input request processor 120 operatively coupled to the request server 116, and an output processor 122 operatively coupled to the request server 116 and configured to provide data of interest from information records 126 stored in the master database 114.

A recognition module 127, may be operatively coupled to the request server 116 and to the database controller 110, and may further include a license plate recognition system (LPRS) 128 or ALPR system (automatic license plate recognition), an optical character recognition system 129, and a dimensional recognition system 129A.

Users may communicate with the request server 116 using a variety of remote or external communication devices 130 to transmit a data request to the request server 116 regarding a particular vehicle of interest. The external communication devices 130 may be wireless devices and/or wired devices, such as cellular telephones 132, smart phones 134, computers 136, mobile devices 138, tablets 139, a GPS navigation device 140, or any suitable communication device 142. The user may transmit a data request by inputting: a vehicle identification number (VIN), a license plate number, a photographic image of a license plate or the vehicle itself, or a video containing images of the vehicle and its associated license plate, as captured by the communication device 130 or by a digital camera 144.

Figure 2:
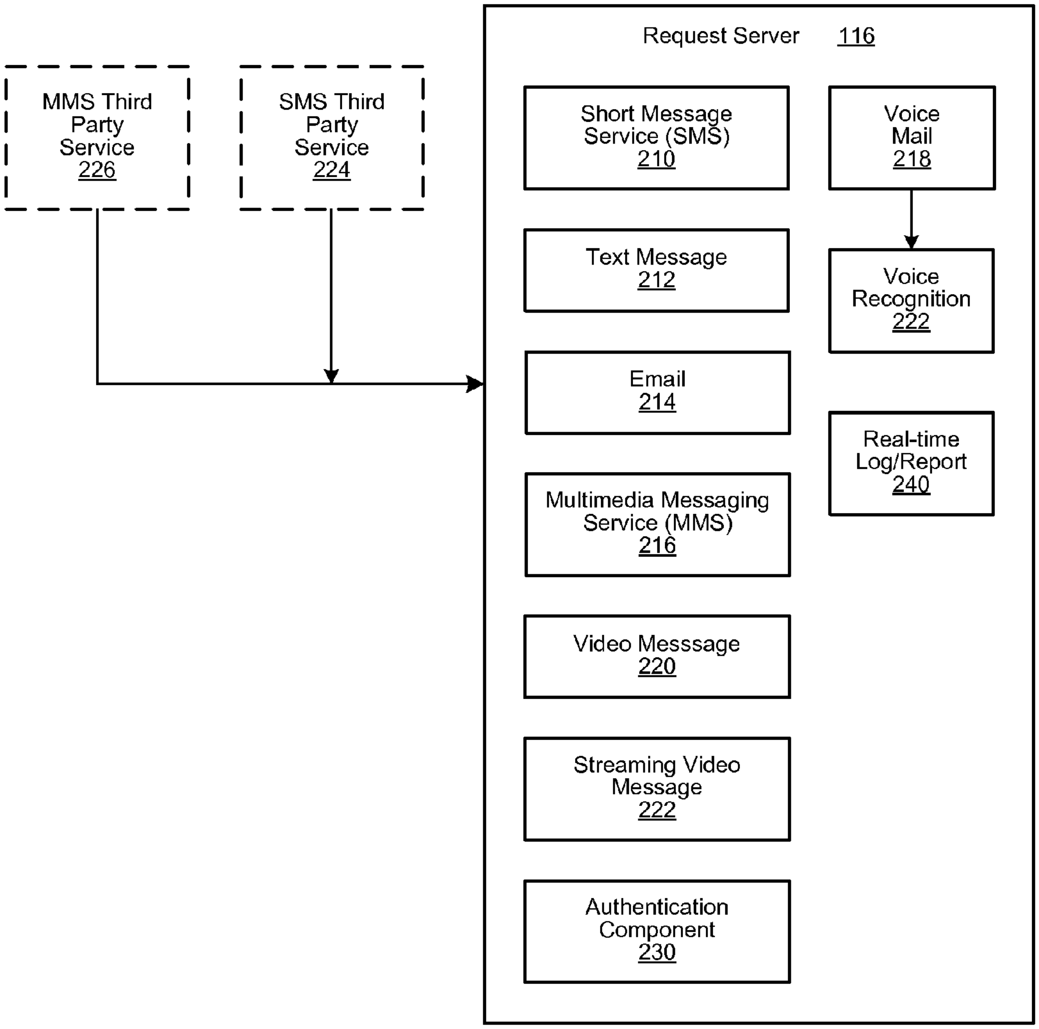
FIG. 2 is a block diagram of a request server according to a specific embodiment.

Referring to FIG. 2, when the request server 116 receives the request from the user, the request may be in a variety of different formats using different communication protocols depending upon the type of external communication device 130 that is used and the communication mode in which it is operating. The dataflow may include varied protocols and message formats handled by hardware or software modules or components, such as a short message service (SMS) module 210, a text message module 212, an email message module 214, a multimedia message service (MMS) module 216, a voicemail (VM) module 218, a video module 220, or a streaming video module 222, for example. Any suitable component or module may be used to decode, format, and process the message received. The SMS module 210 may be a SMS server dedicated to receiving and processing SMS communication, while the MMS module 216 may be an MMS server dedicated to receiving and processing MMS communication.

Each of the requests or messages from the user is preferably decoded and handled by the input message component or handler directed toward that particular protocol or message format. Further, a voice recognition system 222 may be coupled to the voicemail module 218 to convert the voice message into a text message so that the text message can be provided to the request server 116. The request server 116 may include an authentication component 230 configured to verify and authenticate that the requesting user is authorized to access the vehicle tracking and locating system 100. A real-time log 240 may also be generated and maintained by the request server 116.

Such input message modules (210, 212, 214, 216, 218) or handlers, whether hardware, software, a combination of hardware or software, may be resident within the request server 116 or within another component of the vehicle tracking and locating system 100, or may be separate and independent from the vehicle tracking and locating system 100.

Alternatively, some input message components or handlers, services, and functions may be provided by a third-party or third-party component. The short message service (SMS) service module 210 may be provided by or replaced by an independent third-party SMS messaging service 224, and may be external to the vehicle tracking and locating system 100. The third-party SMS messaging service 224 may be provided by an entity referred to as "TextMeForBusiness.com." Such third-party SMS providers 224 essentially host the SMS transactions and provide the necessary infrastructure to manage and service the SMS transactions, such as text to screen formatting, auto-response, message formatting, and other features. Such third party providers receive the data request from the external communication devices 130, and decode, extract, format, and forward the user message to the request server 116.

Similarly, a third party MMS (multi-media service) provider 226 may replace the multi-media messaging service module 216 in the request server 116, and may be external to the vehicle tracking and locating system 100. Such third-party MMS providers 226 essentially host the MMS transactions and provide the necessary infrastructure to manage and service the MMS transactions, such as text to screen formatting, auto-response, message formatting, and other features. Such third party providers receive the data request from the external communication devices 130, and decode, extract, format, and forward the user message to the request server 116. As referred to herein, the SMS service module 210 may be used interchangeably with the SMS third party provider service 224 because the end result is essentially similar, that is, the message is received and processed. Similarly, the MMS service module 216 may be used interchangeably with the MMS third party provider service 226.

As an overview regarding the user process for accessing the vehicle tracking and locating system 100, the following example involves use of the SMS format, but is applicable to any embodiment utilizing a different message format. In this example, the user may type a plurality of digits, such as a multi-digit access code, into the external communication device 130, such as a cellular telephone 132, smart phone 134, or any other communication device, which directs the call to the short message services (SMS) module 210 or to the SMS third party provider 224, for example. In response, the SMS module 210 or the SMS third party service provider 224 requests that the user provide a query, assuming that the user is authorized to access the system.

The user or agent may respond by entering "plate=333ABCD." This informs the vehicle tracking and locating system 100 that the user is inquiring about a license plate number. Alternatively, the user may respond by entering the VIN number. Further, the user may respond by attaching a photographic image, a video stream, or any attachment containing the license plate number for which further information is desired, as will be discussed in greater detail below.

The SMS third party service provider 224 decodes and formats the request to the request server 116, which in turn, obtains the requested information from the master database 114 via a database lookup. If the requested license plate number is found in the database, information about the corresponding vehicle is provided to the user via the SMS third party service provider 224. Such information includes, for example, data about a possible repossession action or stolen vehicle action, the registered owner of the vehicle, name of debtor or lien-holder, lien status, vehicle insurance status, vehicle year, vehicle make, vehicle model, vehicle color, VIN number, associated finance company, date that vehicle entered a repossession list or a stolen vehicle list, case number, location status (address and/or GPS coordinates), law enforcement status (stolen, owner APB, predator in a restricted area, etc.), and the like. Also, when a match is found, the system may transmit an electronic copy of the documents corresponding to the vehicle of interest.

Figure 3:
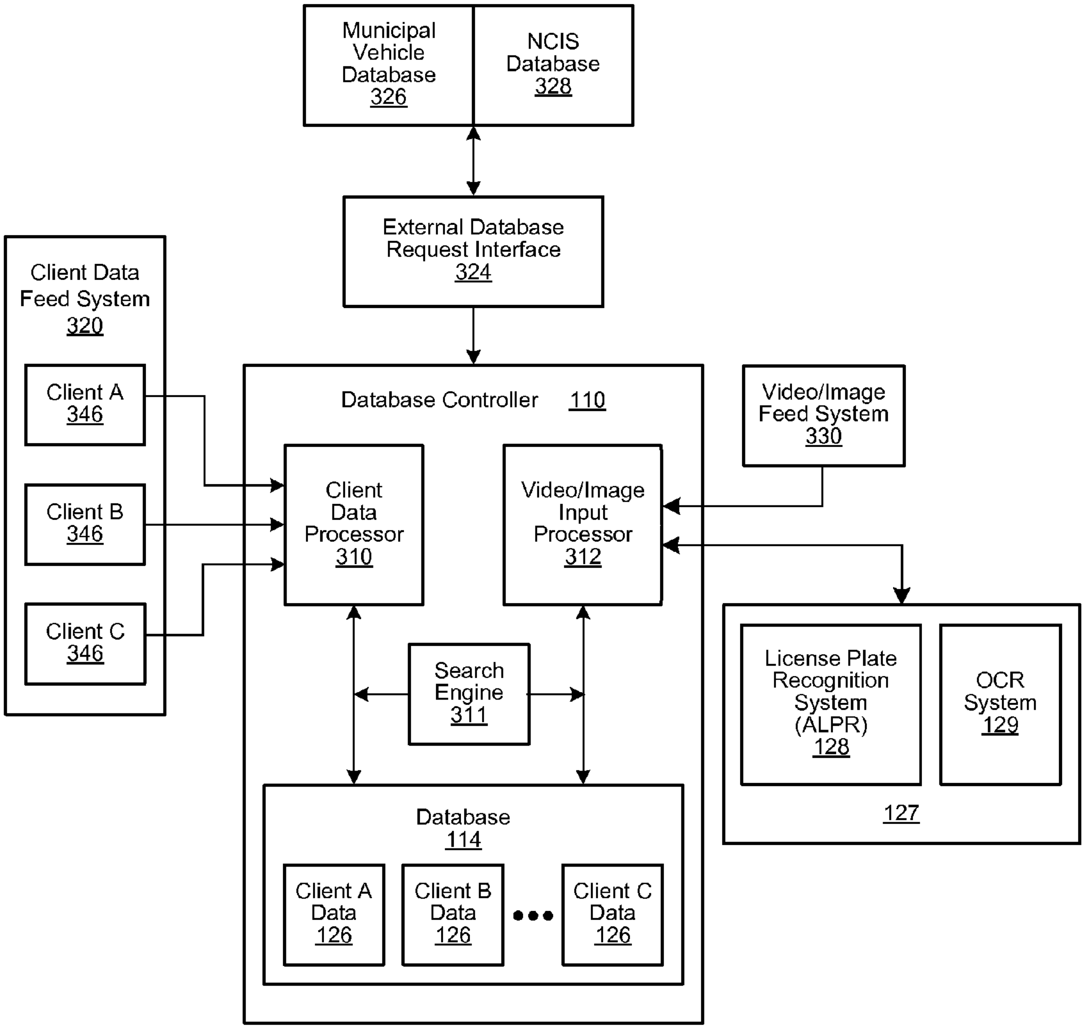
FIG. 3 is a block diagram of a database controller according to a specific embodiment.

Referring to FIG. 3, one embodiment of the database controller 110 is illustrated. The database controller 110 includes a client data processor 310, a search engine 311, and a video and image input processor 312 operatively coupled to the master database 114. The client data processor 310 may receive input from a client data feed system 320, while the video and image input processor 312 may receive input from a video/image feed system 330, the license plate recognition system 128, and an optical character recognition system 129.

The master database 114 may be updated based on input from the client data feed system 320, which includes multiple "clients" 346. Such clients 346 may represent the various credit companies, banking entities, finance credit companies, vehicle credit agencies, and law enforcement agencies, which may have agreements in place with owner of the vehicle tracking and locating system 100. Such clients 346 or third-party entities provide data to the master database 114 through the database controller 110 based on vehicles that are subject to repossession for nonpayment of loans with respect to banking and credit agencies, while law enforcement may provide additional data with respect to stolen vehicles. Alternatively, the database controller 110 may access remote databases through an external database request interface or communication link 324. The database controller may request information from external databases, such as municipal vehicle databases 326 and the National Crime Information Center (NCIC) database 328, which maintains a record of all vehicles reported stolen in the United States, and other municipal, state, and Federal databases.

The client data feed system 320 facilitates data transfer from the clients 346, including documents and messages. The data may be in the form of CSV files (comma separated value), PDF documents, or may be any suitable data format. The database controller 110 may create, update, and/or delete information records in the master database 114 based on the information received from the clients 346. The documents and data may be transmitted using standard file transfer protocol, such as FTP, for example.

In one specific embodiment, the master database 114 may be segmented or divided into separate logical data areas corresponding to the specific client source. For example, a first client may be TRW Credit Corp., while a second client may be GE Credit Corp. The master database 114 may be segmented for security and privacy considerations because if a vehicle is subject to repossession with respect to a first client, only repossession agencies authorized by that first client are permitted to access the corresponding information and engage in action related to the repossession of the subject vehicle.

In some embodiments, a user may be denied information about a vehicle subject to repossession if that user is not authorized by the client 346. Thus, in one embodiment, such a user may not even be informed by the vehicle tracking and locating system 100 that a requested vehicle license plates corresponds to a vehicle subject repossession if that user is not authorized by the client to receive such information. Accordingly, even if a particular vehicle is subject to a repossession order, if the user inquiring about that that license plate number is not a member of one of the repossession companies authorized to handle repossession of that car, that user may not receive an affirmative indication that the vehicle is subject to repossession. Alternatively, the user may be given an indication that the vehicle is subject to repossession but that the requesting user is not authorized to go forward with the associated repossession.

In other embodiments, rather than logically or physically segmenting the master database 114, the information records 126 may instead be tagged or associated with the corresponding client 346. The search engine 311 may inspect the associated client identifier and provide requested information only if there is a match between the information record associated with the client 346 and the authorization status of the user requesting the information.

The database controller 110 may provide access to the master database 114 on a multi-tier basis. For example, authentication and access may be provided based on three access levels, such as a master administrator level, a manager level, and a user level, each with different privileges and access rights.

Master administrator rights are typically granted to selected employees of the company that own and control the master database 114. The master administrator determines which users and managers are able to obtain data regarding vehicle subject repossession based upon arrangements between clients 346 and the third-party repossession companies.

The master administrator is responsible for accepting or pre-authorizing dial-in telephone numbers, authorized IP addresses, or other external communication device 130 identifiers corresponding to the various users. The master administrator can create, delete, and manage the user-level and the manager-level accounts. Further, the master administrator may set a particular maximum number of users and managers in the vehicle tracking and locating system 100.

The master administrator may also access the real-time log 240 that is maintained by the vehicle tracking and locating system 100. The real time log 240 may record all of the queries requested by the users, and all the responses provided to the users. The report may indicate the frequency of successful license plate number matches and statistics surrounding the matching process, such as the number of matches per 100 queries, and the like. Such statistics may also include geographical data so that the success rate for matches can be correlated with various geographical locations.

The manager-level entity is typically a member of an external repossession company, which may employ for example, ten users, agents, or drivers. A technician at the external repossession company may be considered to be a manager, and such a manager is typically able to provide authorization to the various users or drivers, under authorization from the master administrator.

Figure 4:
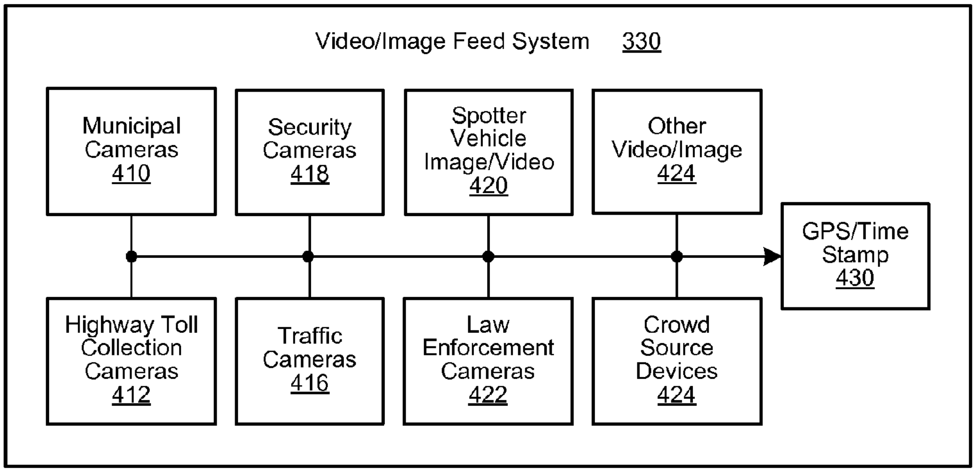
FIG. 4 is a block diagram of a video and image feed system according to a specific embodiment.

The video and image input processor 312 of the database controller 110 receives video and image data from the video/image feed system 330. The video/image feed system 330 is shown in greater detail in FIG. 4. The video/image feed system 330 provides a real-time data stream of license plate data for storage in the master database 114.

The video data and image data may be received from a plurality of sources, such as from municipal cameras 410, highway toll-collection cameras 412, traffic cameras 416, security cameras 418, spotter vehicle cameras 420, law enforcement cameras 422, "crowd-source" external devices 424, and other video image capture devices 424, which may correspond to mobile image capture devices or fixed image capture devices. Spotter vehicle cameras 420 are typically mounted on "spotter cars" and/or tow trucks, which may continuously capture images of vehicles and their license plates as the spotter vehicles drive along streets, travel through parking lots, and along other access routes.

Once the images of the vehicles and their license plates are captured, by whatever means available, automatic license plate recognition processing may be applied to the images to isolate, extract, and identify the license plate number prior to storage in the master database 114, along with the time and date that the image was captured, and including the geographical location or coordinates of the image capture. To facilitate this process, the license plate recognition system 128 (ALPR) and the OCR system 120 may be operatively coupled to the video and image input processor 312.

The automatic license plate recognition system (ALPR) 128 may be a commercially available recognition system embodied either in hardware components and/or software components. For example, the license plate recognition system 128 may be commercially available from PIPS Technology, a Federal Signal Company, of Knoxville, Tenn. Software processing modules to facilitate ALPR may also be commercially available from Inex/Zamir of Knoxville, Tenn., under the name of Insignia software.

In one embodiment, the video images are transmitted with an indication of a time and date that the image was captured in addition to the geographic location where the image was captured. The geographic location may be provided by an associated GPS system 430 coupled to the image capture device. Alternatively, for fixed image capture devices, a known geographical location of the fixed camera may be transmitted, or an identifying number of the fixed camera may be transmitted so that the vehicle tracking and locating system 100 can assign a predetermined geographical location to the fixed image capture device.

As described above, the user may transmit a data request to the request server 116 by inputting a vehicle identification number (VIN) or a license plate number. Using the external communication device 130, such as a digital camera, the user may also capture an image of the license plate number and transmit a photographic image of a license plate number to the request server 116. A video stream may also be captured. The input request processor 120 may transmit the image or the video stream to the video and image input processor 312 of the database controller, which in turn, may utilize the license plate recognition system 128 and/or the OCR system 129 to convert the photographic image into a license plate number suitable for storage in the master database 114.

As described above, the user may direct an MMS message to either the multimedia messaging service module 216 or to the MMS third party service provider 226. The MMS data format is more complex than a text message because the information requested is usually embedded in an image or series of images (video stream), and must be extracted using some form of recognition processing, such as the license plate recognition system 128 and/or the optical character recognition system 129. Once the MMS message has been received by the MMS service module 216 each image or each frame of the video stream is analyzed to locate and isolate the portion of the image that contains the license plate image.

The OCR recognition system 129 may be used to determine the particular portion of the image that contains characters, such as the license plate. The OCR recognition system 129 may crop and discard the portion of the image that is determined not to contain text data. The OCR recognition system 129 may be a color OCR system or an infrared OCR system. Alternatively, if the image as originally captured has a tight-focus, meaning that the image captured only includes the image of the license plate, the image may be transmitted directly to the license plate recognition system 128 without preprocessing by the OCR recognition system to isolate the license plate.

In another embodiment, the OCR recognition system 129 may be incorporated into the ALPR system 128. The ALPR system 128 may then analyze the image of the license plate to convert the image to alphanumeric characters representing the license plate number.

The following is an example of an agent or a spotter using a mobile device, such as a smart phone 134, to transmit MMS data to the vehicle tracking and locating system 100. The agent or user may walk through parking garage or public area, or may be a passenger in a moving vehicle, and may point the hand-held mobile device 130 (external communication device) toward parked or moving vehicles to capture images of the license plates.

The smart phone 134 may be recording and saving the video stream in memory or may be streaming the video in real-time through a cellular connection to the MMS third party service provider 226 or the MMS service module 216. In this way, each image or sequence of images is processed by the vehicle tracking and locating system 100 to isolate the plurality of license plate numbers captured.

Each license plate number captured is forwarded to the database controller 110 to perform a data match and or save the data if it does not exist in the database 114. Preferably, all license plate numbers are saved in the master database 114 along with the time that the image was captured and the location of capture based upon the GPS tag associated with the data transmission.

In one embodiment, to reduce the storage requirements of the database 114, certain license plate numbers may be deleted if they are "stale," meaning that the associated timestamp is very old. Whether the external communication device 130 is streaming the video in real-time or whether it is transmitting the recorded video or still frame image at a later time from memory, the MMS module 216 analyzes the images on a frame-by-frame basis.

Turning back to FIG. 2, the request server 116 may provide the authentication component 230, which includes login control and verification. In one embodiment, the user is not required to affirmatively log-in. Rather, using caller-ID, IP address confirmation, or a similar process, the authentication component 230 may recognize the phone number or internet address of the caller or other identification of the external communication device 130, which has been preauthorized for acceptance by the authentication component 230. Each telephone or other communication device 130 is preferably authorized in advance for acceptance by the authorization component 230.

Alternatively, the authorization component 230 need be not be resident in the request server 116 or in the vehicle tracking and locating system 100, and may be provided by a third-party component or service, such as the SMS third party service provided 224 or the MMS third party service provider 226 discussed above. Any third-party provider may assist in authenticating the user.

In another embodiment, when the user places a call to the request server 116, the request server transmits a display interface or GUI to the user, and the user may then provide a security code or other password to gain access to vehicle tracking and locating system 100. Of course, the third-party component or service such as the SMS or MMS third party service provider 224, 226 may also transmit the display interface or GUI to the user.

Once the user has transmitted a request to the request server and 116 and has been properly authenticated, the search engine 311 determines if the requested license plate number is found in the database, subject to the above-described criteria for permitting the user to obtain access to information. If a match is found, the output processor 122 organizes and transmits the data of interest to the user in one of a variety of possible formats, depending upon the format in which the request was received.

The data of interest may be transmitted as text, a synthesized voice message based on text, and may also be transmitted in the form of documents, such as in PDF format, JPG format, or document text format, or in other suitable electronic format. The data of interest may include information about the vehicle, including vehicle year, vehicle make, vehicle color, vehicle model, vehicle owner, lien holder, vehicle identification number, vehicle location history, case number, date of repossession action, reporting agency, credit agency, date stolen if applicable, and the like.

As shown in FIG. 1, each external communication device 130 may include a resident application or "App," 150 which is a specific plug-in or software module installed on the external communication device 130 to facilitate the above communication process. Preferably, the application 150 is installed on a smart phone, tablet, or other device having an operating system used by a large number of people. For example, mobile devices using the Google's Android™ operating system or Apple's iOS™ operating system may implement the application 150.

The application 150 increases the efficiency and flexibility of the system 100, minimizes use of customized hardware and software to reduce cost, and increases user or agent convenience, satisfaction, and efficiency. Such an application 150 may replace customized software modules, and provides a uniform interface to the user or agent. Further, because most external communication devices 130, such as smart phones 134, are GPS-enabled, images and video captured by such devices can be tagged with the GPS coordinates so that the location of the image (vehicle) captured is associated with its corresponding location.

Such applications 150 may be used by the agent, or by the members of the general population that receive compensation to provide video or images to the vehicle tracking and location system 100. This is referred to as "crowd-sourcing," that is, employing the masses or general population as spotters to participate in providing data to the vehicle tracking and locating system 100. For example, students may be paid a commensurate amount to record and/or stream video images of the areas in which they travel using external communication devices 130 they own.

Such video may be recorded for subsequent transmission, or may be transmitted in real-time to the vehicle tracking and locating system 100. The student need only download the application 150 to his or her mobile device and activate the application to permit the device to record any and all images. In one embodiment, the participating students or spotters may be paid a stipend depending upon the volume of recorded information. In another embodiment, to encourage higher-quality information, the students may be paid a percentage of fees received if the information provided by the student is used in an actual repossession or identification of a vehicle in question.

Embodiments of the vehicle tracking and locating system 100 are not limited to finding only vehicles of interest, such as vehicles subject to repossession. The vehicle tracking and locating system 100 may also find application in parking enforcement. For example, a parking enforcement officer or agent may have an external communication device 130, such as a smart phone 134, for which the above-described application 150 is installed.

The officer or agent may travel past many parked vehicles while the smart phone 134 streams video data or still photographs to the vehicle tracking and locating system 100, preferably in MMS format. Based upon a recorded images of the plurality of license plates, the vehicle tracking and locating system 100 may isolate, recognize and identify each license plate number and compare the license plate numbers to the municipal vehicle database 326 operated by a municipality or other government body. The municipal vehicle database 326 may contain records corresponding to vehicles having outstanding parking or other violations. The vehicle tracking and locating system 100 may also request data from the National Crime Information Center (NCIC) database 328.

Based on a match between the license plate number recognized and the license plate number contained in the database, the output processor 122 may provide an output to a parking meter enforcement agent that confirms that a vehicle scanned has outstanding tickets, and thus should be impounded or booted with a Denver Boot™ or similar immobilization device. The parking officer or agent may receive a graphic output or notification directly on the smart phone 134 or display device. Alternatively, the smart phone 134 may be coupled to a wireless or wired printer so that a hardcopy can be printed. If the officer or agent as printing capability, a further citation may be printed and issued and a affixed to the vehicle in lieu of impoundment.

In another embodiment, the license plate recognition system 128 (ALPR) may be used in conjunction with the dimensional recognition or object recognition system 129A so that the dimensions or general shape of the vehicle may be identified and quantified. In this way, a license plate number recognized can be compared to the municipal vehicle database 326 to verify that the license plate indeed belongs to that specific type of vehicle to which it is affixed. For example, once the license plate number has been recognized, the make and model of the vehicle may be obtained from the official vehicle registration database 326.

A vehicle dimension database 160 (FIG. 1) may be part of or may be included in the master database 114 or may be separate therefrom. The vehicle dimension database 160 may include information as to the overall dimensions of every make and model of vehicle. In operation, when the license plate recognition system 128 (ALPR) extracts the license plate number of a particular vehicle, it may instruct the database controller 110 to request the make and model of that vehicle from the municipal vehicle database 326 or other database containing official vehicle registration information, if such information is not already of record in the master database 114. Of course, the request for information from the municipal vehicle database 326 need not necessarily be made by the database controller 110, but rather, may be made by the request server 116 or other component of the vehicle tracking and locating system 100.

In one embodiment, for example, if the municipal vehicle database 326 indicates that the vehicle scanned is a Volkswagen, but the vehicle dimension database 160 indicates that the size of the vehicle corresponding to the license plate number is much larger than a Volkswagen, an alert can be issued indicating that the license plate may be stolen and is affixed to the wrong vehicle.

In another embodiment, the vehicle tracking and locating system 100 may provide a "proximity alert" for fleet and dispatch management. In this embodiment, the identity of vehicles of interest (whether subject to repossession or of interest for any reason, such as for marketing purposes) are downloaded or imported into a GPS navigation device 140, or map enabled smart phone 134 installed in the agent's or spotter's vehicle. Of course, the GPS navigation device 140 must have a sufficiently large memory to accommodate all of the data. The GPS navigation device 140 may be a commercially available navigation device, such as those provided by Garmin Corporation.

The GPS navigation device 140 may then compare the current location of the agent's vehicle (in a real-time), against the location of all of the downloaded data corresponding to various vehicles of interest. The GPS navigation device 140 may then compare the location of each vehicle of interest in memory to the current location of the agent's vehicle to determine the distance from the agent's vehicle to the last known location of the vehicle of interest, assuming the time stamp associated with the vehicle of interest is not "stale."

If the GPS navigation device 140 determines that the vehicle of interest is within a predetermined radius of the agent's vehicle, for example, within one mile, and the time stamp was relatively recent, for example, within five minutes, the GPS navigation device 140 may alert the agent and direct the agent to the last known location of the vehicle of interest.

In that way, the agent could attempt to locate and track the vehicle of interest and take appropriate action. Of course, the predetermined radius and the time stamp differential (i.e., the current time minus the timestamp associated with the vehicle of interest) may be increased or decreased depending upon the application and the scope of the agent's work. Also, to keep the data "fresh," or up-to-date, the information corresponding to the vehicles of interest are preferably downloaded to the GPS navigation device 140 periodically, such as every 5 minutes.

Alternatively, the data corresponding to the vehicles of interest need not be downloaded and remain resident in the GPS navigation device. Rather, the GPS navigation device may communicate in real-time with the vehicle tracking and location system 100, and may transmit the current location or coordinates of the agent's vehicle to the vehicle tracking and location system, for example every 30 seconds. The vehicle tracking and location system 100 may then compare the location of the agent's vehicle to all of the vehicles of interest in the database 114 based upon the location of the vehicle of interest and the time that the vehicle of interest was spotted.

If the vehicle of interest was spotted within a predetermined radius of the current location of the agent vehicle, and if the time that the vehicle of interest was spotted was relatively recent (i.e. within the last 10 minutes, for example), the vehicle tracking and location system 100 may inform the agent through the GPS navigation device 140 that a vehicle of interest was spotted and may be close by. The GPS navigation device 140 may also provide navigational directions to the agent to facilitate pursuit of the vehicle interest, at least with respect to its last known location.

Note that the vehicle tracking and location system 100 may provide navigational directions to the agent or spotter should the agent not be in possession of a GPS navigational device. Based on the coordinates of a destination, reverse geo-coding can be applied to either the vehicle interest or the agent vehicle. Reverse geo-encoding means that once the GPS coordinates of a destination are known, a map or navigational directions, or an address can be transmitted to the agent's smart phone or other device. In one embodiment, a commercially available reverse geo-coding system, such as Google Maps™, Microsoft Bing On-Line™, Microsoft MapPoint™, Streets & Trips™, or MapQuest™, may be used.

The vehicle tracking and locating system 100 may be embodied as a system cooperating with computer hardware components and/or as computer-implemented methods. The vehicle tracking and locating system 100 may include a plurality of software modules or subsystems. The components, modules, or subsystems, such as the request server 116, the input request processor 120, the output processor 122, the database controller 110, the video and image input processor 312, the client data processor 310, the search engine 311, the license plate recognition system 128, the optical character recognition system 129 and other components and/or modules of the vehicle tracking locating system 100, may be implemented in hardware, software, firmware, or any combination of hardware, software, and firmware.

Such components, modules, or subsystems may or may not reside within a single physical or logical space. For example, the components, modules, or subsystems referred to in this document and which may or may not be shown in the drawings, may be remotely located from each other and may be coupled by a communication network.

Figure 5:
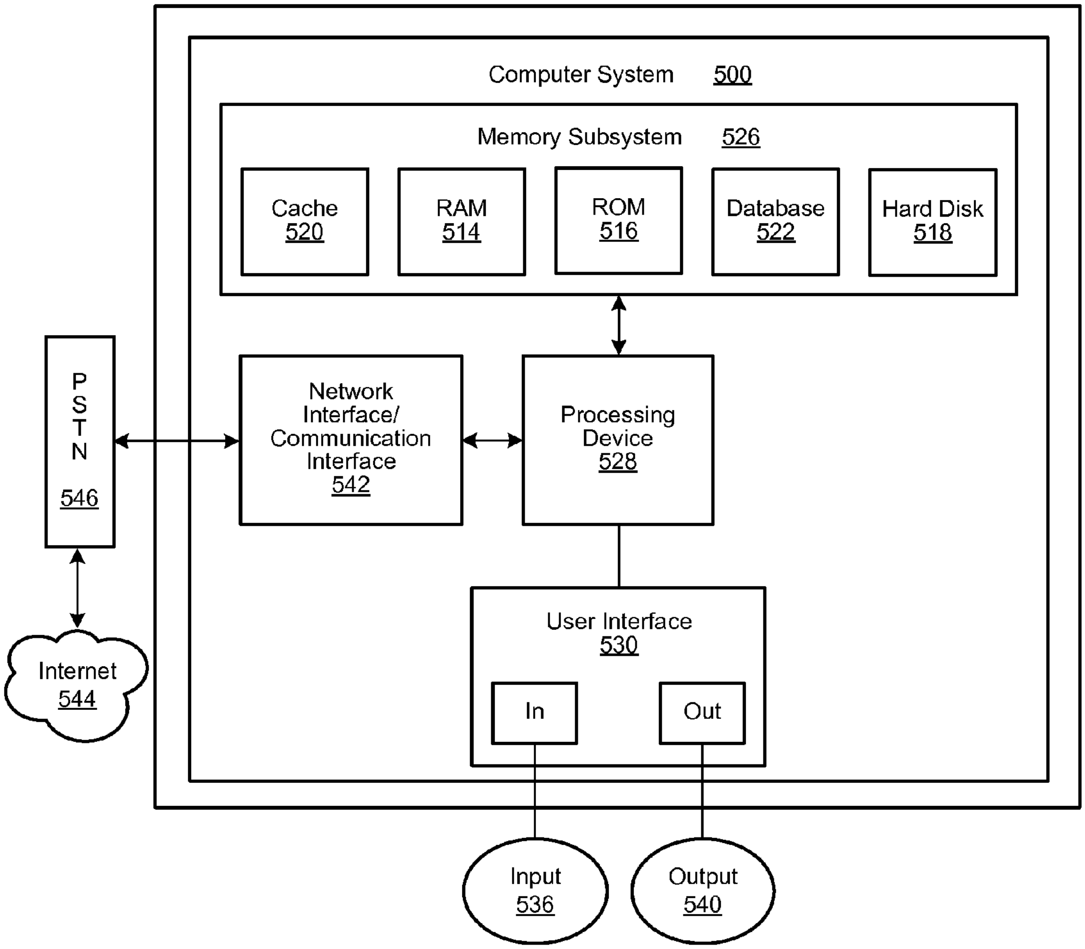
FIG. 5 is a block diagram of a representative computer system or server according to a specific embodiment.

FIG. 5 is a high-level hardware block diagram of one embodiment of a computer system hardware embodiment that may perform some or all of the functions of some of the components, modules, and/or subsystems described above. Such a computer system 500 may be embodied as a system cooperating with computer hardware components and/or as computer-implemented methods and is shown in FIG. 5 as a high-level hardware block diagram of a system computer 500 that may be used to execute software or logic to implement the processing of the components, modules, and/or subsystems described above.

The computer 500 may be a personal computer and may include various hardware components, such as RAM 514, ROM 516, hard disk storage 518, cache memory 520, database storage 522, and the like (also referred to as "memory subsystem 526"). The computer 500 may include any suitable processing device 528, such as a computer, microprocessor, RISC processor (reduced instruction set computer), CISC processor (complex instruction set computer), mainframe computer, work station, single-chip computer, distributed processor, server, controller, microcontroller, discrete logic computer, and the like, as is known in the art. For example, the processing device 528 may be an Intel Pentium® microprocessor, x86 compatible microprocessor, or equivalent device, and may be incorporated into a server, a personal computer, or any suitable computing platform.

The memory subsystem 526 may include any suitable storage components, such as RAM, EPROM (electrically programmable ROM), flash memory, dynamic memory, static memory, FIFO (first-in, first-out) memory, LIFO (last-in, first-out) memory, circular memory, semiconductor memory, bubble memory, buffer memory, disk memory, optical memory, cache memory, and the like. Any suitable form of memory may be used, whether fixed storage on a magnetic medium, storage in a semiconductor device, or remote storage accessible through a communication link. A user or system interface 530 may be coupled to the computer system 500 and may include various input devices 536, such as switches selectable by the system manager and/or a keyboard. The user interface also may include suitable output devices 540, such as an LCD display, a CRT, various LED indicators, a printer, and/or a speech output device, as is known in the art.

To facilitate communication between the computer 500 and external sources or other components, modules, and subsystems, a communication interface 542 may be operatively coupled to the computer system 500. The communication interface 542 may be, for example, a local area network, such as an Ethernet network, intranet, Internet, or other suitable network 544. The communication interface 542 may also be connected to a public switched telephone network (PSTN) 546 or POTS (plain old telephone system), which may facilitate communication via the Internet 544. Any suitable commercially-available communication device or network may be used.

Figure 6:
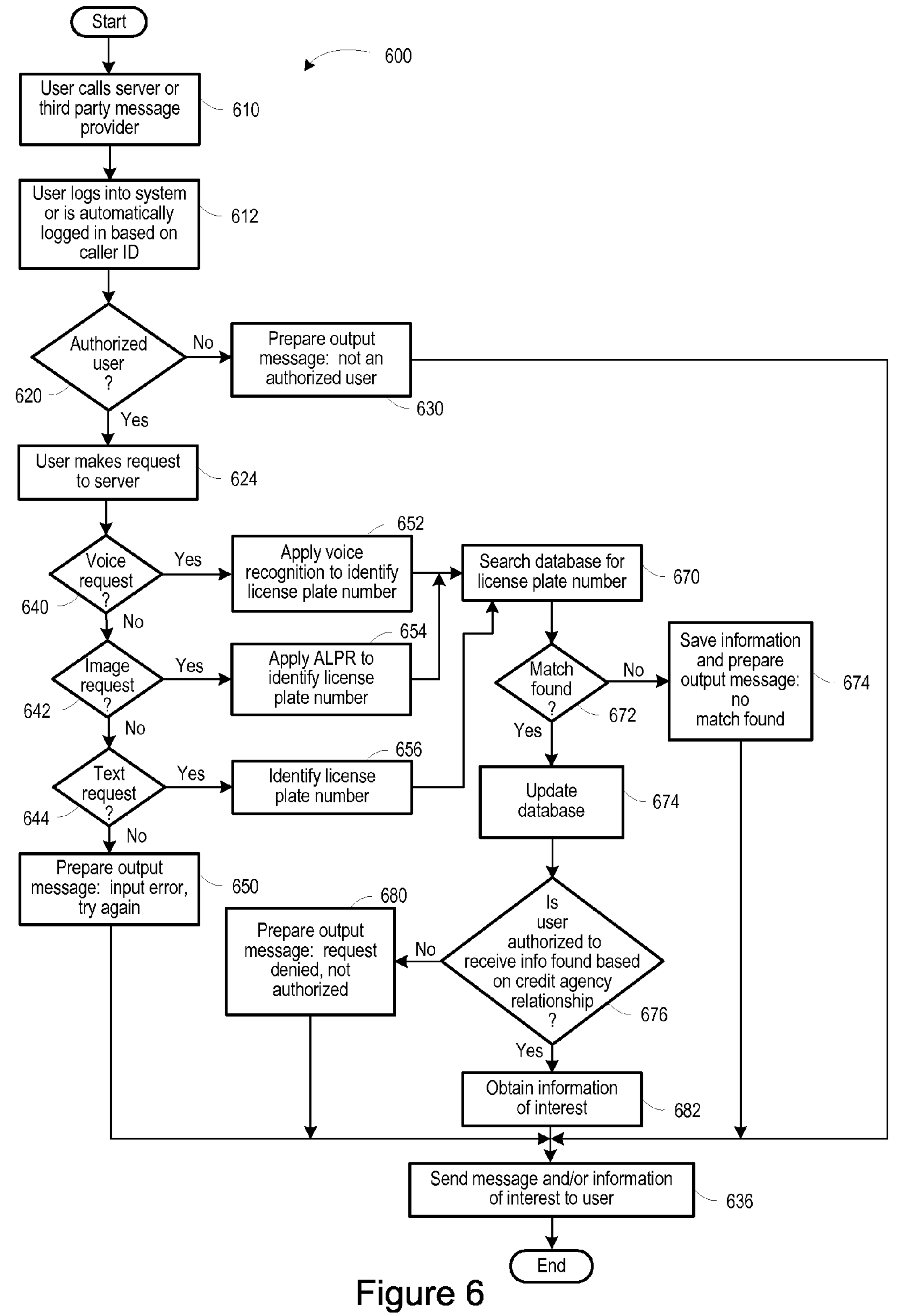
FIG. 6 is a flowchart illustrating a process of the vehicle tracking and locating system according to a specific embodiment.

FIG. 6 illustrates a process 600 according to the vehicle tracking and locating system 100. In one embodiment, the user contacts the request server 116 using the external communication device 130, or calls the third-party provider service 224 based on the communication format (610). The user then logs into the vehicle tracking and locating system 100, or alternatively, is automatically logged in based on caller-ID, IP address, or other identifier (612) corresponding to the external communication device 130.

If the user is authorized (620) to access the vehicle tracking and locating system 100, the user then initiates a request (624) to the request server or third-party provider service 224. If the user is not authorized (620), an output message is prepared indicating that the user is not authorized (630), processing then branches to a component that outputs the prepared message (636), and the routine exits. The component that prepares and/or sends the output message, in some embodiments, may be the output processor 122.

The user may provide the request in a variety of formats, such as a voice request (640), an image request (642), or a text request (644). If the request is not in any of the required formats, an output message is prepared indicating an input request error, which requests that the user try again (650).

If the request is a voice request, voice recognition is applied to identify the text of the request (652), which corresponds to a license plate number. If the request is an image request where the user is transmitting a digital image of a license plate, automatic license plate recognition is applied to identify the license plate number in the request (654). If the request is an video request or streaming video request, the OCR system 129 isolates the portions of the images/frames containing the license plate and forwards the cropped portions to the license plate recognition system 128 so as to identify the license plate number in the request (654). If the request is a text message, license plate number in the message is extracted (656).

Once the license plate number of interest is been extracted and identified, the search engine 311 searches the master database 114 to determine if a match exists (670). In one embodiment, if the request contains video or photographic images, and if no match is found (672), the license plate number and associated information (such as location and time) are saved in the database so as to continuously build the database, and an output message is prepared indicating that no match has been found (674). Processing then branches to the component that outputs the prepared message (636), and the routine exits.

In one embodiment, if the request contains video or photographic images, and if a match is found in the master database (672), the master database is updated with respect to the location and time (674). Next, the matching record is inspected to determine if the user is authorized to view the matching information and/or engage in actions relative to the repossession of the vehicle for which a match is found (676). If the user is not authorized, an output message is prepared indicating that the user is not authorized and that the request is denied (680). Processing then branches to the component that outputs the prepared message (636).

If the user is authorized to view the matching information and/or engage in actions relative to the repossession of the vehicle for which a match is found, the information of interest is obtained from the matching database record (682), and an output message is prepared indicating that the information is available. The output message is then sent to the user along with the information of interest obtained from the database (636), and the routine exits.

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device.

The medium may be implemented as any device that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A vehicle tracking and locating system for providing information to a user about a vehicle of interest, the system comprising:

a database controller coupled to a client data processor, the database controller in operative communication with a database, and configured to receive data corresponding to vehicles from a plurality of client sources, and save the data as information records corresponding to each client source;

one or more external communication devices, including at least one wireless communication device, configured to transmit a data request by the user, the data request corresponding to the vehicle of interest;

a request server configured to receive the data request, the data request received in one of a plurality of communication formats;

an input request processor operatively coupled to the request server and configured to obtain information records from the database corresponding to the data request; and an output processor operatively coupled to the request server and configured to provide data of interest from the obtained information records for transmission to the respective communication device.

2. The system according to claim 1, wherein the data request includes a vehicle identification number (VIN), a license plate number, a photographic image of a license plate number, or a video stream containing images of a license plate number.

3. The system according to claim 1, wherein the communication formats are selected from the group consisting of a short message service (SMS), a text message, an email message, a multimedia message service (MMS), a photographic format, steaming video format, and a voicemail (VM) format.

4. The system according to claim 1, wherein the client sources correspond to banking entities, credit entities, loan entities, automobile credit agencies, and/or law enforcement agencies.

5. The system according to claim 4, wherein the data received from the client sources indicate that the vehicle of interest is a stolen vehicle or a vehicle subject to repossession.

6. The system according to claim 4, wherein the database is logically or physically segmented in accordance with the corresponding client source.

7. The system according to claim 4, wherein the database information records contain entries indicating the corresponding client source.

8. The system according to claim 1, wherein the request server is operatively coupled to an external service provider, which is configured to receive the data request from the remote communication, and configured to decode, format, and forward a user message to the request server.

9. The system according to claim 8, wherein the external service provider is a third party SMS messaging service or a third party MMS messaging service.

10. The system according to claim 1, wherein the request server includes a voice mail system operatively coupled to a voice recognition system configured to convert an audio voice message into a text message, and provide the text message to the request server.

11. The system according to claim 1, wherein the output processor provides the data of interest in the form of text, a voice message, and/or documents.

12. The system according to claim 11, wherein the data of interest is selected from the group consisting of a vehicle year, vehicle make, vehicle color, vehicle model, vehicle owner, lien holder, vehicle identification number (VIN), and vehicle location history.

13. The system according to 1, further including a video and image feed system operatively coupled to at least one camera, and operatively coupled to the database controller and configured to provide images of vehicle license plates; and a license plate recognizer having a processor, and coupled the video and image feed system, and configured to isolate and identify a license plate number based on the image of vehicle license plate.

14. The system according to claim 13, wherein the database controller stores the identified license plate number along with an indication of a time, a date, and a location that the image of the vehicle license plate was captured.

15. The system according to claim 13, wherein the video and image feed system receives images from municipal cameras, highway toll-collection cameras, traffic cameras, security cameras, crowd-sourcing communication devices, and/or spotter vehicle cameras.

16. The system according to claim 13, wherein the video and image feed system receives the images from fixed cameras, and associates the images received from the fixed cameras with a location of the fixed camera.

17. The system according to claim 13, wherein the video and image feed system receives the images from fixed cameras along with an indication of the location of the fixed camera.

18. A vehicle tracking and locating method for providing information to a user about a vehicle of interest, the method comprising:

storing in a database, data corresponding to vehicles, the data provided by a plurality of client sources, and saved as information records corresponding to each client source;

transmitting a data request by the user, the data request corresponding to the vehicle of interest;

receiving the data request in one of a plurality of communication formats;

decoding the data request;

obtaining information records from the database corresponding to the data request; and transmitting data of interest from the obtained information records to the user.

19. A vehicle tracking and locating method for providing information to a user about a vehicle of interest, the method comprising:

using an external communication device, and encoding a record identifier of the motor vehicle of interest;

communicating the encoded record identifier to a request server;

receiving and decoding the encoded record identifier by the request server;

obtaining information records from a database corresponding to the decoded record identifier, the database containing information records provided by a plurality of client sources, each information record in the database identified as corresponding to a client source; and transmitting data of interest from the obtained information records to the external communication device.

* * * * *